US008434881B2

(12) United States Patent
Cao et al.

(10) Patent No.: US 8,434,881 B2
(45) Date of Patent: May 7, 2013

(54) SOLAR SIMULATOR FOR FLEXIBLE SOLAR MODULES

(75) Inventors: Xinmin Cao, Sylvania, OH (US); Aarohi Vijh, Sylvania, OH (US); Paul E. Sims, Toledo, OH (US); Steven Marks, Holland, OH (US); Bradley S. Mohring, Delta, OH (US)

(73) Assignee: Xunlight Corporation, Toledo, OH (US)

( * ) Notice: Subject to any disclaimer, the term of this patent is extended or adjusted under 35 U.S.C. 154(b) by 471 days.

(21) Appl. No.: 12/804,391

(22) Filed: Jul. 21, 2010

(65) Prior Publication Data

US 2011/0019388 A1    Jan. 27, 2011

Related U.S. Application Data

(60) Provisional application No. 61/271,501, filed on Jul. 22, 2009, provisional application No. 61/397,084, filed on Jun. 7, 2010.

(51) Int. Cl.
*F21V 7/00* (2006.01)
*H05B 35/00* (2006.01)

(52) U.S. Cl.
USPC .................................................. 362/1; 362/2

(58) Field of Classification Search ................... 362/1, 2; 702/116; 324/96
See application file for complete search history.

(56) References Cited

U.S. PATENT DOCUMENTS

| 2,290,478 | A | * | 7/1942 | Matlas | 355/117 |
| 2004/0112421 | A1 | | 6/2004 | Spivack et al. | |
| 2008/0115823 | A1 | * | 5/2008 | Kinsey | 136/246 |
| 2009/0287446 | A1 | * | 11/2009 | Wang et al. | 702/116 |

* cited by examiner

*Primary Examiner* — Sikha Roy
*Assistant Examiner* — Glenn Zimmerman
(74) *Attorney, Agent, or Firm* — Emch, Schaffer, Schaub & Porcello, Co., L.P.A.

(57) ABSTRACT

A solar cell simulator that is cylindrically symmetrical to test photovoltaic devices that are flexible. A particular embodiment would be made from plexiglass or similar acrylic material. The present invention produces a spectrum that simulates the spectral distribution of solar light that we observe on the Earth's surface. The simulator would be comprised of a tubular pulsed light source, a pulsed power supply, a tubular light spectrum filter, an IV electrical measurement station, a cylinder-shaped module holder to place the flexible large-area module during the measurement. All cylinders share the same central axis. This maintains radial uniformity of all light intensity and can be used for electrical measurements (IV curves under illumination) of flexible large-area PV modules.

19 Claims, 13 Drawing Sheets

The absorption spectrum of water.

SOLAR SIMULATOR FOR FLEXIBLE SOLAR MODULES

This application claims the benefit of provisional patent application Ser. No. 61/271,501; filed on Jul. 22, 2009 and provisional patent application Ser. No. 61/397,084; filed on Jun. 7, 2010.

FIELD OF THE INVENTION

This invention relates to a new pulsed solar simulator method and apparatus for producing large-area, uniform intensity of light. More particularly, the invention relates to systems and methods that employ long tubular light sources for generating large-area, cylinder-shaped, uniform intensity of light and specifically placement of the photovoltaic (PV) device on a co-axial cylinder at the time of measurement. This method can be used for the electrical device characterization of flexible large area PV modules.

BACKGROUND OF THE INVENTION

Photovoltaic Solar Cells require testing to performance specifications. This testing takes place in a solar simulator— where lights, typically pulsed, shine upon the Photovoltaic (PV) device and the electrical response to the light is characterized.

Most solar simulators are designed to measure flat PV devices. Additionally, these prior art simulators can only measure devices that are on the order at most of 4 feet by 8 feet or smaller. As PV devices grow in size the measurement is problematic for several reasons. For example, a key consideration of Solar Simulators is uniformity of illumination. ASTM E-927 requires that the radiance non-uniformity not exceed +/−2%. In the prior art, flat solar simulator systems have achieved this requirement. However, obtainment of that stringent non-uniformity criteria on a large flat table simulator is technically challenging and in addition very expensive.

Therefore, a need exists for a Solar Simulator which can measure flexible PV devices of any length.

SUMMARY OF THE INVENTION

Described herein is an improved solar cell simulator for flexible solar cells. This simulator is designed to improve the uniformity of illumination during the testing of flexible photovoltaic devices. This simulator is designed to maintain a constant distance from centrally located lamps by having cylindrical symmetry compared to a flat planar surface which is standard in the prior Art. The particular embodiment of this Invention uses materials advantageous to testing of a solar cell with a particular response to light. In particular, water is a spectral filtering agent, which can be utilized with the simulator of this Invention.

The invention is directed to a simulator for testing flexible photovoltaic devices. The simulator has a curved surface topography upon which the flexible photovoltaic device is positioned. A light source is positioned in spaced apart relationship with the curved surface. The light source is disposed to provide a constant light intensity to the flexible photovoltaic device. A hollow transparent cylinder can be positioned around the light source. The hollow transparent cylinder is disposed to receive a fluid that can act to filter the light from the light source.

Other objects and advantages of the present invention will become apparent to those skilled in the art upon a review of the following detailed description of the preferred embodiments and the accompanying drawings.

DETAILED DESCRIPTION OF THE PREFERRED EMBODIMENT(S)

Spectral distribution and materials considerations are important to the preferred Embodiment of this Invention.

Figure 1:
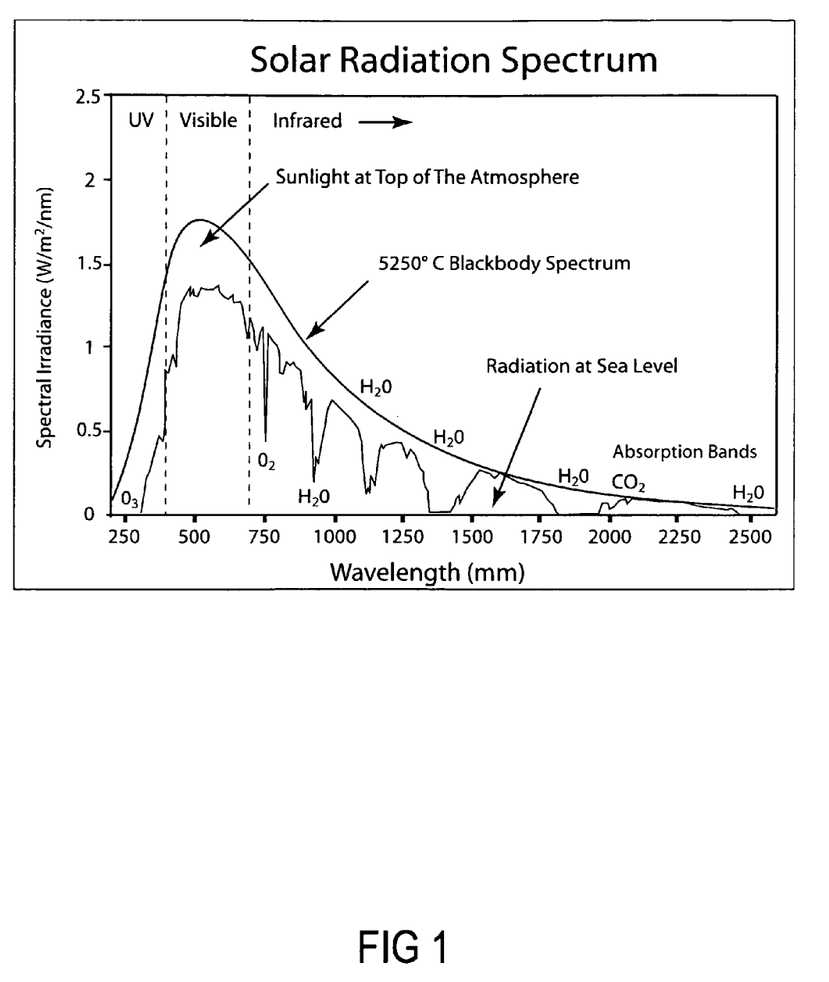
FIG. 1 is a graph of the spectrum of light from the sun. In general, a simulator should duplicate that spectral distribution as closely as possible.

FIG. 1 is the spectrum of light from the sun as observed on the Earth.

Figure 2:
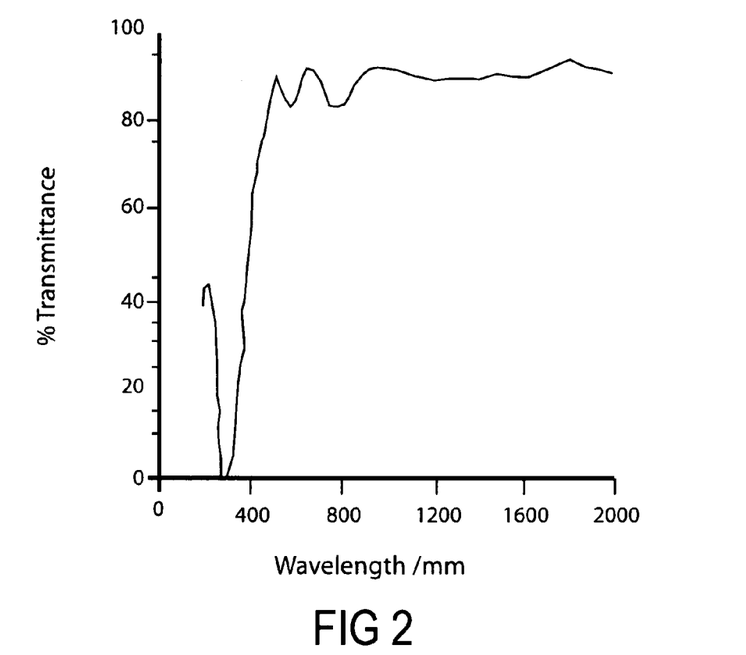
FIG. 2 is a graph of the Transmission Spectrum of a specific Transparent Conductive Oxide (TCO), Indium Tin Oxide (ITO) used in many photovoltaic devices.

In general, a simulator should duplicate that spectral distribution as closely as possible. However, the details of the solar cell spectral response of the photovoltaic device need to be considered. In particular, most thin-film PV devices use a transparent conducting oxide (TCO) layer. In the present case the TCO layer is preferably Indium Tin Oxide (ITO). FIG. 2 shows that ITO acts a spectral filter and decreases the amount of light with a wavelength below 400 nm reaching the photocurrent generating part of the PV device. Thus, we can use materials that filter out light with a wavelength below 400 nm.

Figure 3:
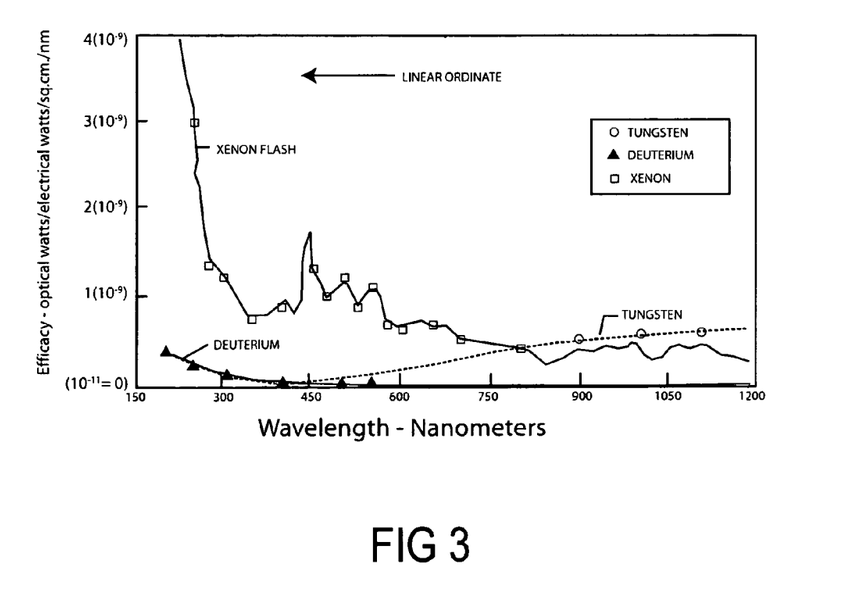
FIG. 3 is a graph of the Emission Spectrum of Xenon Flash Lamps.

FIG. 3 depicts the emission spectrum of Xenon flash lamps. There is a significant amount of radiation below 400 nm that is unneeded by our device.

Figure 8:
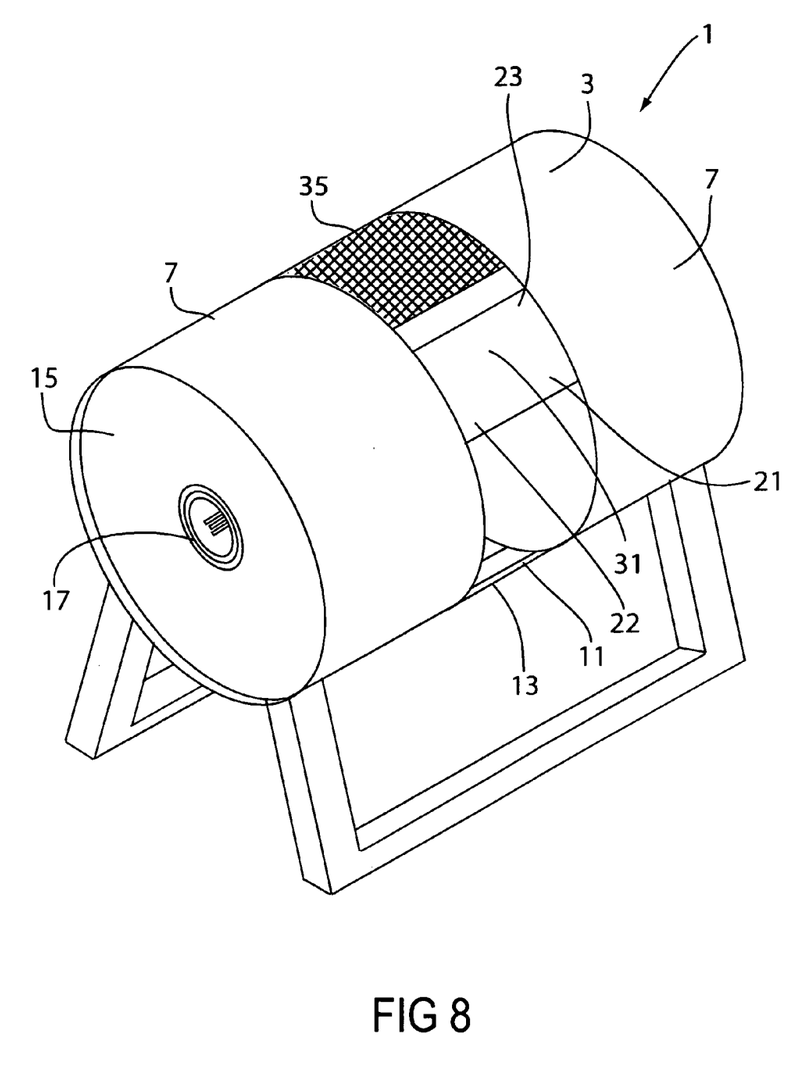
FIG. 8 is a perspective depiction of this Invention—a cylinder solar simulator.
Figure 9A:
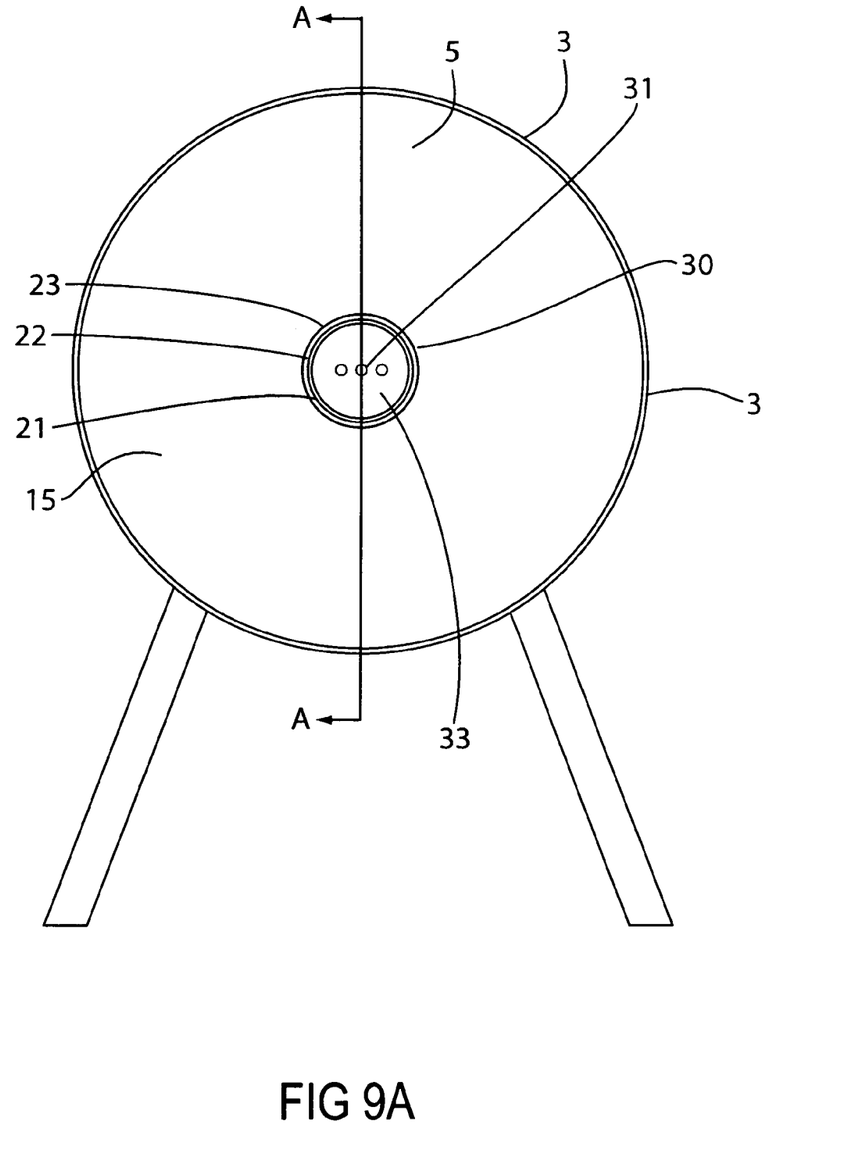
FIG. 9A is a cross-section depiction of this Invention perpendicular to the axis of symmetry.
Figure 9B:
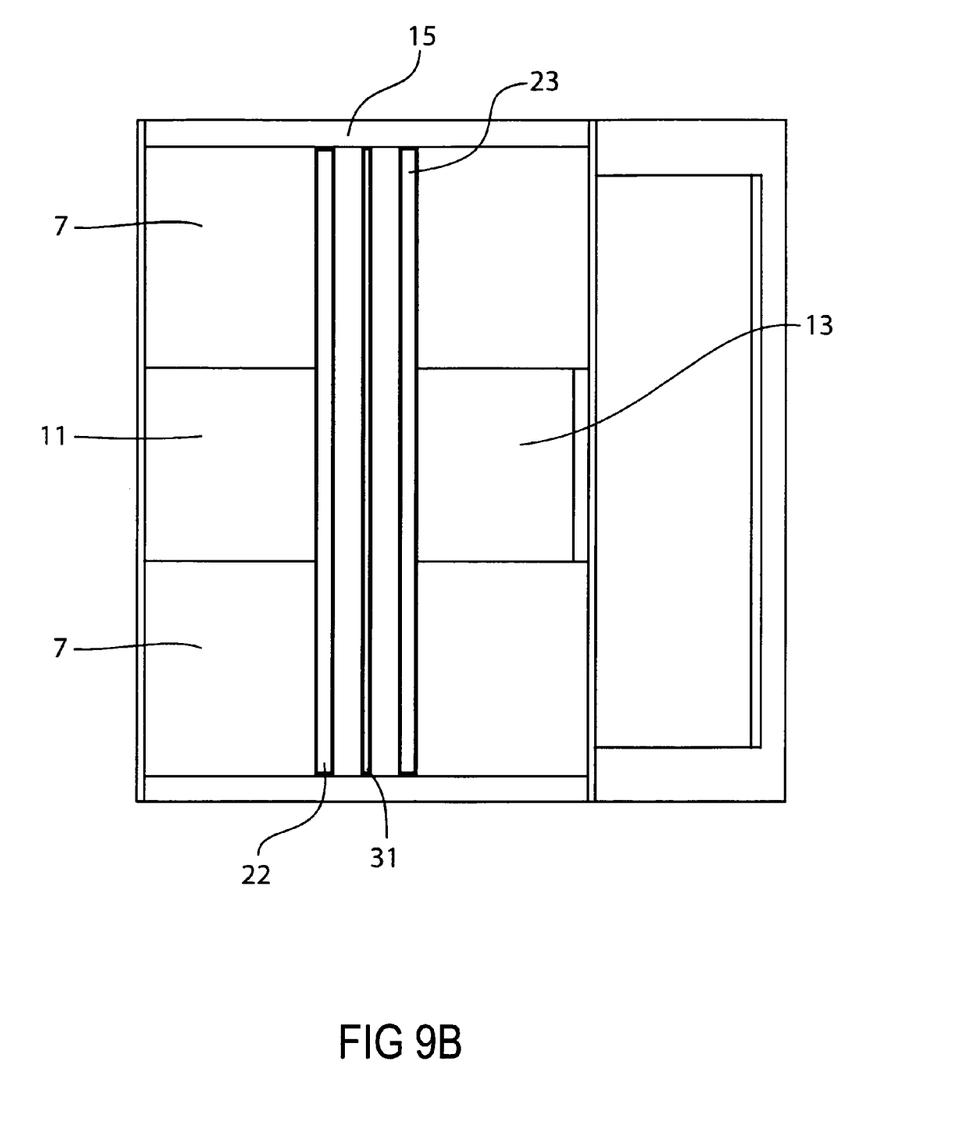
FIG. 9B is a cross-section depiction of the Invention coplanar to the axis of symmetry.
Figure 11:
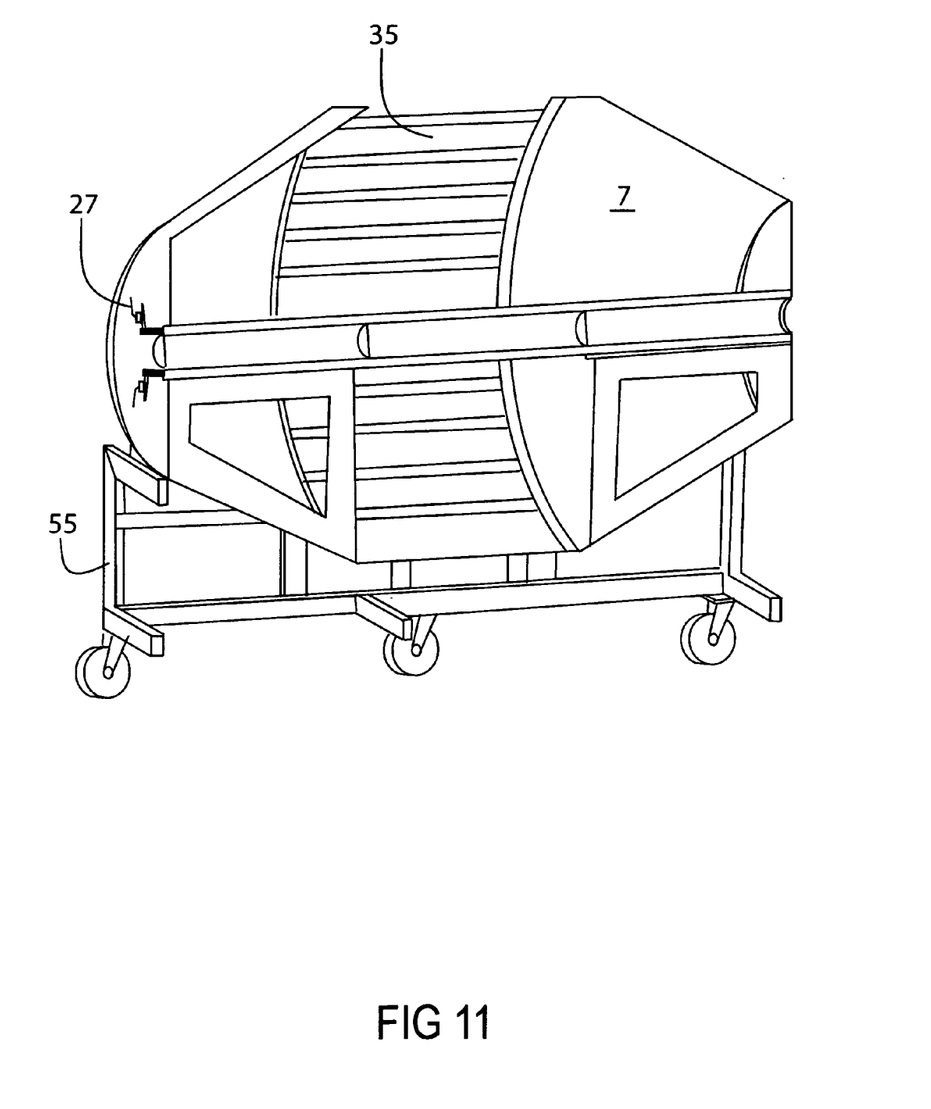
FIG. 11 is a cross-section depiction of the Invention showing different details.
Figure 12:
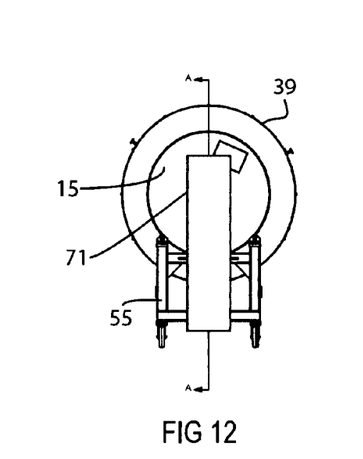
FIG. 12 is a side view depiction of the Invention showing different features of a simulator.
Figure 13:
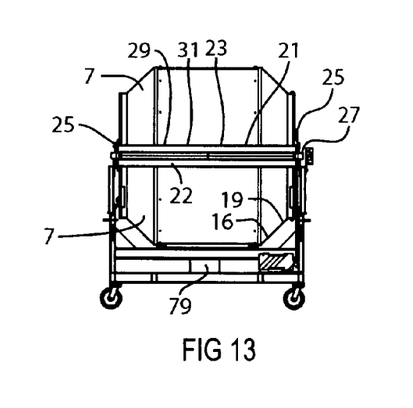
FIG. 13 is a cross-section of FIG. 12.
Figure 14:
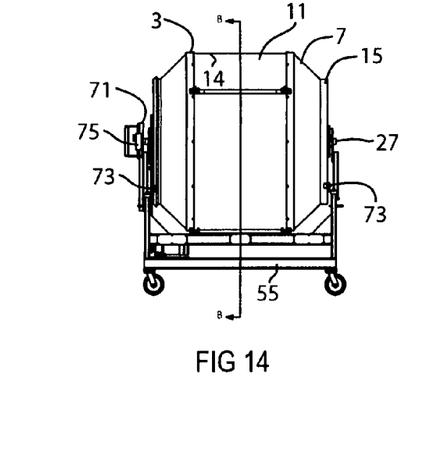
FIG. 14 is a front view depiction of the Invention showing different features of a simulator.
Figure 15:
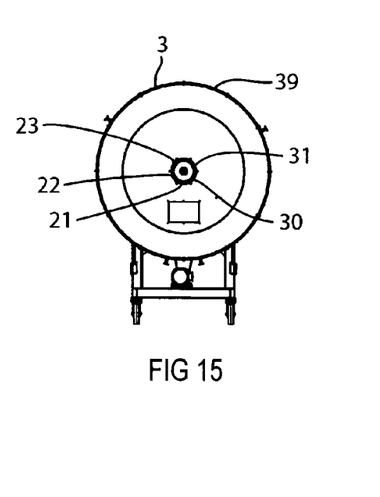
FIG. 15 is a side view depiction of the Invention showing different features of a simulator.
Figure 16:
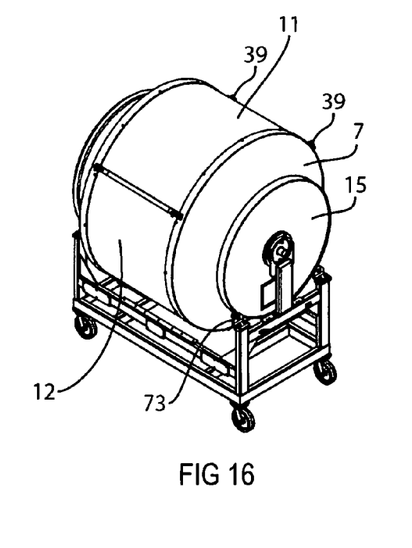
FIG. 16 is a perspective view of additional features of a simulator.
Figure 17:
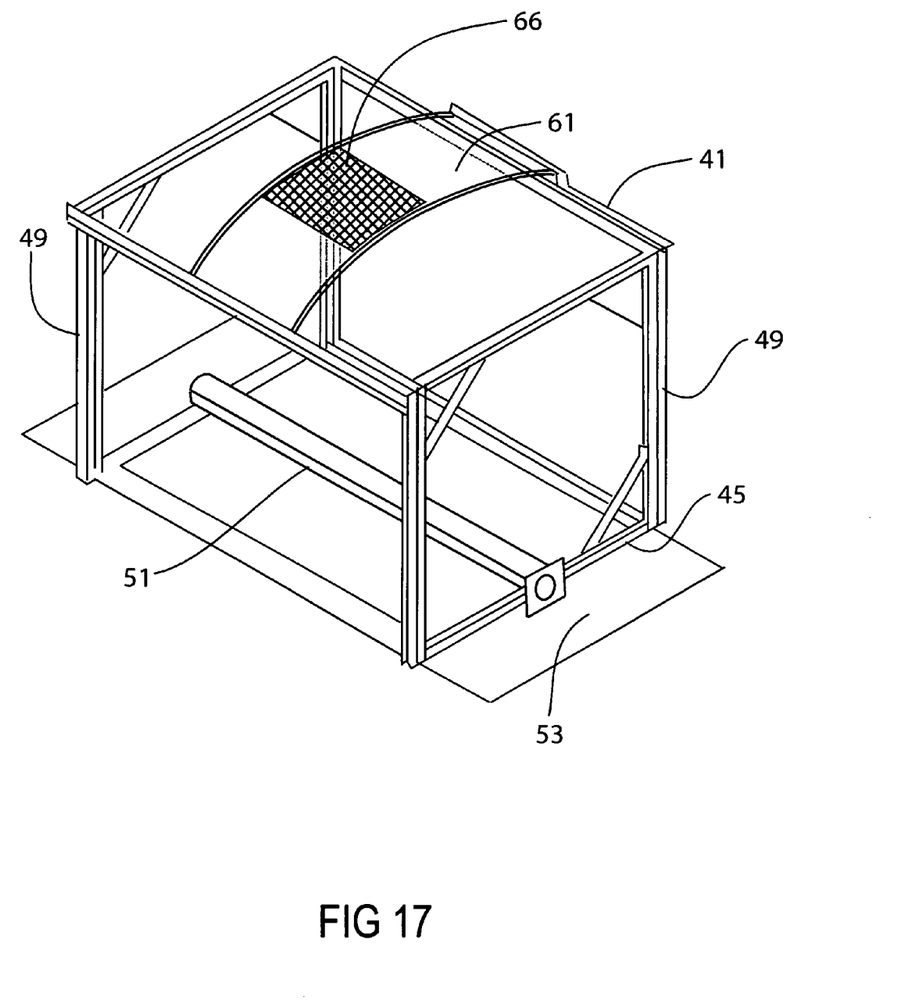
FIG. 17 is a perspective view of additional features of the present invention.

FIGS. 8 and 9 show the simulator for testing flexible PV devices. The simulator 1 has an outer casing 3 having two spaced apart opaque sections 7. Positioned between the two opaque sections 7 is a translucent or transparent section 11. Only the transparent section truly needs to be cylindrical. As used in this specification the term translucent is meant to define a material that transmits light, but is not necessarily completely transparent. The term translucent can, however, also include materials that are transparent. Accordingly, translucent is a broader term that includes materials that are transparent and materials that transmit light, but are not transparent. The opaque sections 7 are usually made of a metallic material such as aluminum and the transparent section 11 is usually made of a plastic such as plexiglass, or acrylic, although other transparent materials such as a glass can be used. Although the outer casing is shown as being cylindrical, it is only necessary for the transparent section 11 to have a curved surface with a constant radius. This added configuration is depicted in FIG. 17 and as shown a complete cylindrical configuration is not necessary to practice the invention. Each opaque section 7 has an end cap 15. Preferably, each end cap has an aperture 17 located essentially in the center of each end cap 15. As shown in FIG. 11, a valve 27 may be positioned on at least one of the end caps 15 to allow for the introduction of a fluid into the interior 5 of the outer casing 3.

As shown in FIGS. 8 and 9, a translucent or transparent inner cylinder 21 and a translucent or transparent outer cylinder 23 are positioned in the interior of the outer casing 3. The inner cylinder is positioned in the interior of the outer cylinder. The ends of the transparent inner and outer cylinders are positioned in alignment with the apertures 17 located in each end cap 15. As shown in FIGS. 12-16, plate 25 is positioned in the apertures 17 in each end cap 15 to position and support the transparent cylinders. The plates 25 and end caps 15 hold the inner and outer cylinders together to form a chamber 22 for receiving a fluid. The transparent inner 21 and outer cylinders 23 are made of a plastic material such as plexiglass, acrylic or other suitable materials. The entire inner and outer cylinders do not have to be made completely of a transparent material. The portion of the inner and outer cylinders that are in alignment with the transparent section 11 are translucent or transparent. The plate 25 is positioned on each end of the inner and outer transparent cylinders to close the ends of the transparent cylinders. A light source 31 is positioned in the interior of the inner transparent cylinder 21. The light source 31 is secured to support disks 33 to position the light source in the inner transparent cylinder 21 and to hold the light source in position in substantially the center of the inner cylinder 21 and the outer casing 3. In practice it has been found to be preferable to use a single light source that is positioned substantially along the longitudinal axis of the outer casing. The transparent inner and outer cylinders are disposed with the longitudinal axis of each transparent cylinder concentric with the longitudinal axis of the outer casing 3. The valve 27 positioned on at least one plate 25 allows a fluid to be introduced into the chamber 22 located between the inner cylinder 21 and the outer cylinder 23. The light source 31 is usually a Xenon flash lamp or similar light producing device. The light source 31 is usually a tubular pulsed type of light. A pulsed power supply is provided, as is well known in the art to power the light source. A photovoltaic solar device 35 is positioned on the exterior surface 13 of the transparent section 11 of the outer casing 3. The PV device is positioned with the side that gathers solar energy facing the light source 31. A plurality of clamps 39 can be used to secure the PV device to the transparent section 11 of the simulator 1. The transparent section 11 positions the photovoltaic solar device 35 a constant distance from the light source 31.

Figure 4:
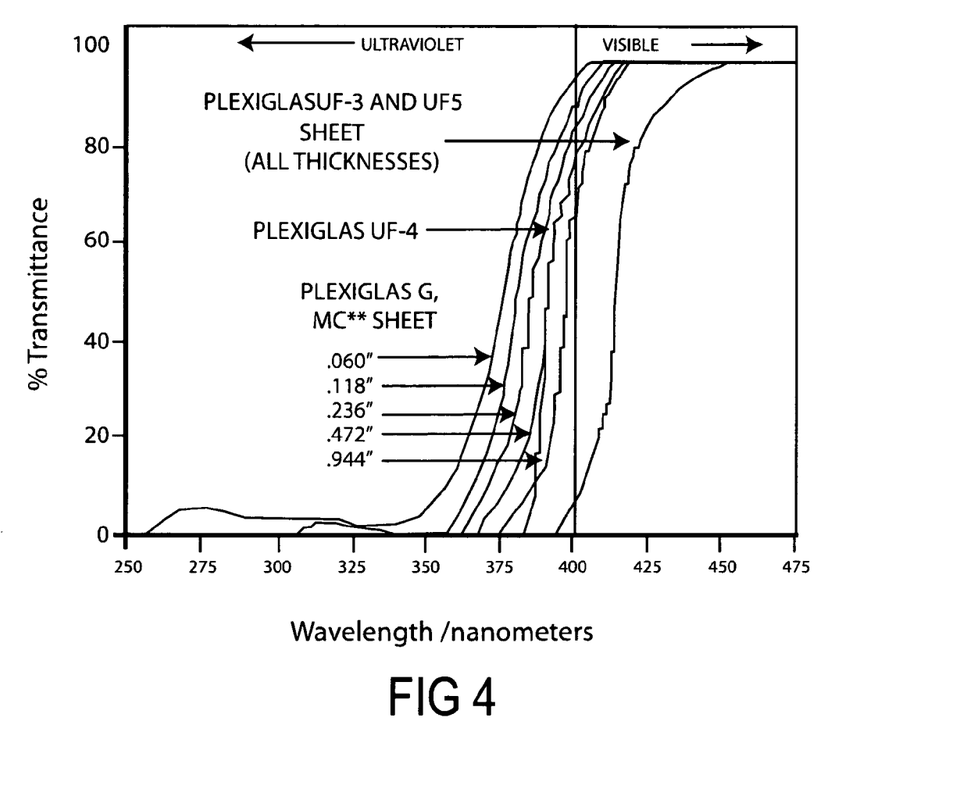
FIG. 4 is a graph of the Transmissive Spectrum of plexiglass
Figure 5:
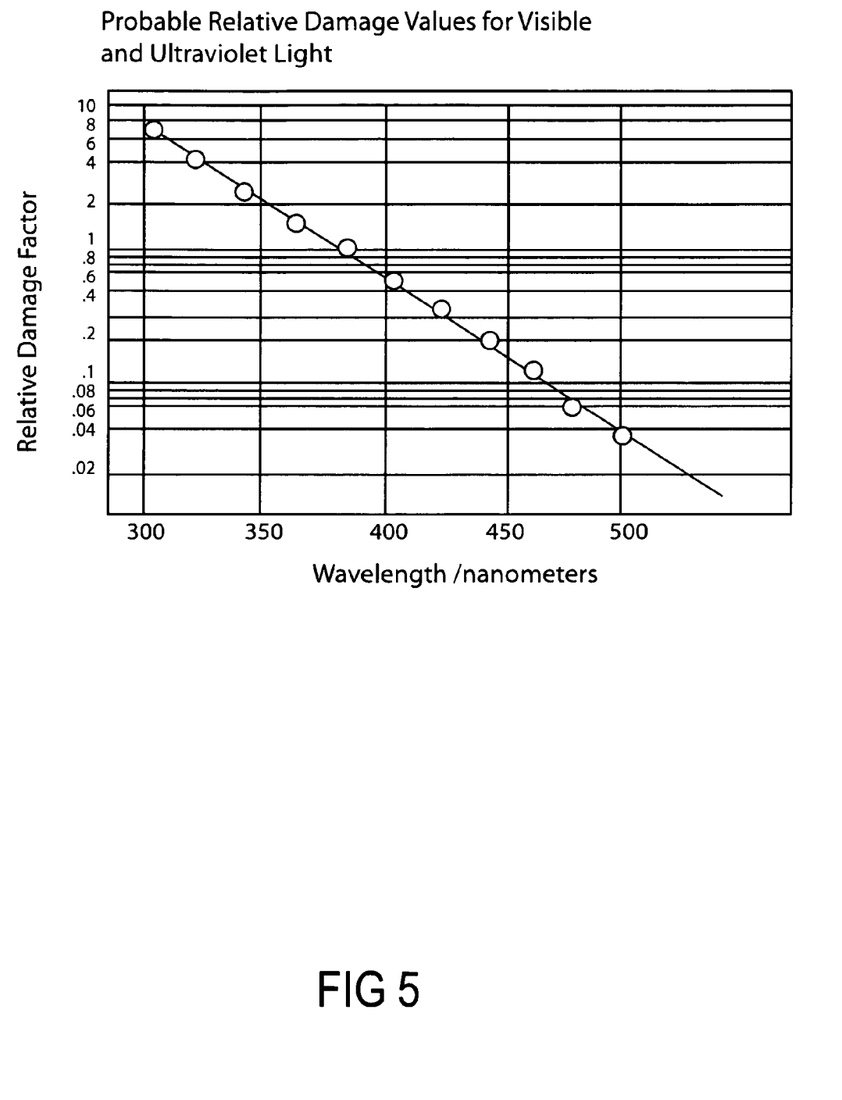
FIG. 5 is a graph of the spectral damage curve of plexiglass

The solar simulator has a transparent section 11 that is comprised of a translucent or transparent material. The transparent material allows the energy from the lamp to be coupled to the PV device. The transparent material is composed of glass, plexiglass, or an acrylic material. As shown in FIGS. 4 and 5, plexiglass may be preferable because it has a transmission curve that matches the lower wavelength cutoff of ITO.

A drive mechanism 71 as shown in FIGS. 12-16 can be attached to the simulator 1 to rotate the outer casing 3 to assist in positioning the PV device on the transparent section 11. The end caps 15 of the outer casing 3 are positioned on rollers 73 that rotatable support the outer casing. The drive mechanism 71 has a motor 75 that is operatively connected to the outer casing 3 so that rotation of the motor causes the simulator 1 to rotate. In addition, the drive mechanism can be operated during the use of the simulator to change the location of the PV device relative to the light source 31 to average out any non uniformity of light energy produced by the light source. The drive mechanism usually rotates the entire outer casing 3 of the simulator 1. However, the drive mechanism 71 can be configured to only rotate the transparent section 11 where the PV device 35 is mounted if desired.

In addition, the interior surface 19 of the opaque section 7 (i.e. the surface that faces the light source 31 can be coated with a layer 16 that will reflect light produced by the light source. The reflective layer acts to enhance or increase the light energy that is experienced by the PV device 35 that is mounted on the transparent section 11 of the outer casing 3. The reflective surface could also be tailored to only reflect light from a certain wave length to help to direct the desired type of light energy at the PV device. The layer 16 can be a reflective paint. It is also possible for the layer 16 on the opaque section 7 to be formed of a material that absorbs light or a particular wave length of light produced by the light source 31 if it is necessary to control or reduce the light energy that contacts the PV device. It is also possible to add or create a texture 12 on the transparent section 11 to help to diffuse the light energy produced by the light source 31. Such a texture on the transparent section may improve the uniformity of the light energy that contacts the PV device. A coating 14 can also be placed on the side of the transparent section 11 that faces the light source 31 to the filter light of certain wave lengths or to protect the transparent section from the effects of UV radiation produced by the light source.

Figure 6:
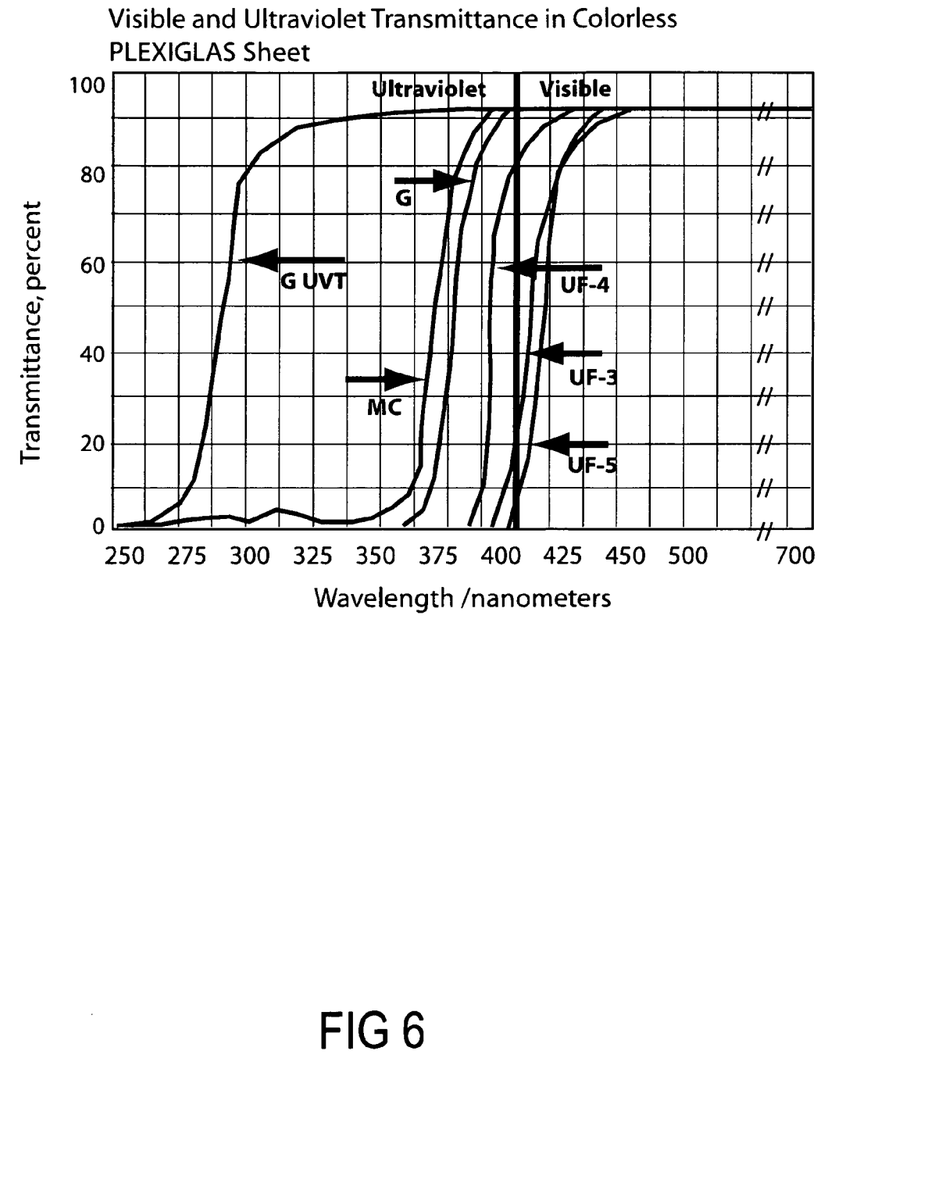
FIG. 6 is a graph of the UV wear curve of plexiglass.

FIG. 6 shows that there is a material fatigue if plexiglass is exposed to UV radiation. Where the transparent section 11 is plexiglass, a smaller, more inexpensive inner plexiglass cylinder 21 may be effectively utilized.

This smaller cylinder 21 will absorb or filter most of the damaging UV light from the Xenon lamps and because it filters most of the damaging UV radiation (FIGS. 4 and 5). Accordingly, the smaller cylinder 21 provides UV protection for the more expensive larger cylinder or transparent section 11. Therefore, the inner cylinder helps prevent having to replace the large expensive transparent section 11 of plexiglass due to UV fatigue. The inner cylinder has at least a translucent section wherein the translucent section on the inner cylinder is positioned to be concentric with the flexible photovoltaic device positioned on the translucent portion of the larger cylinder.

Figure 7:
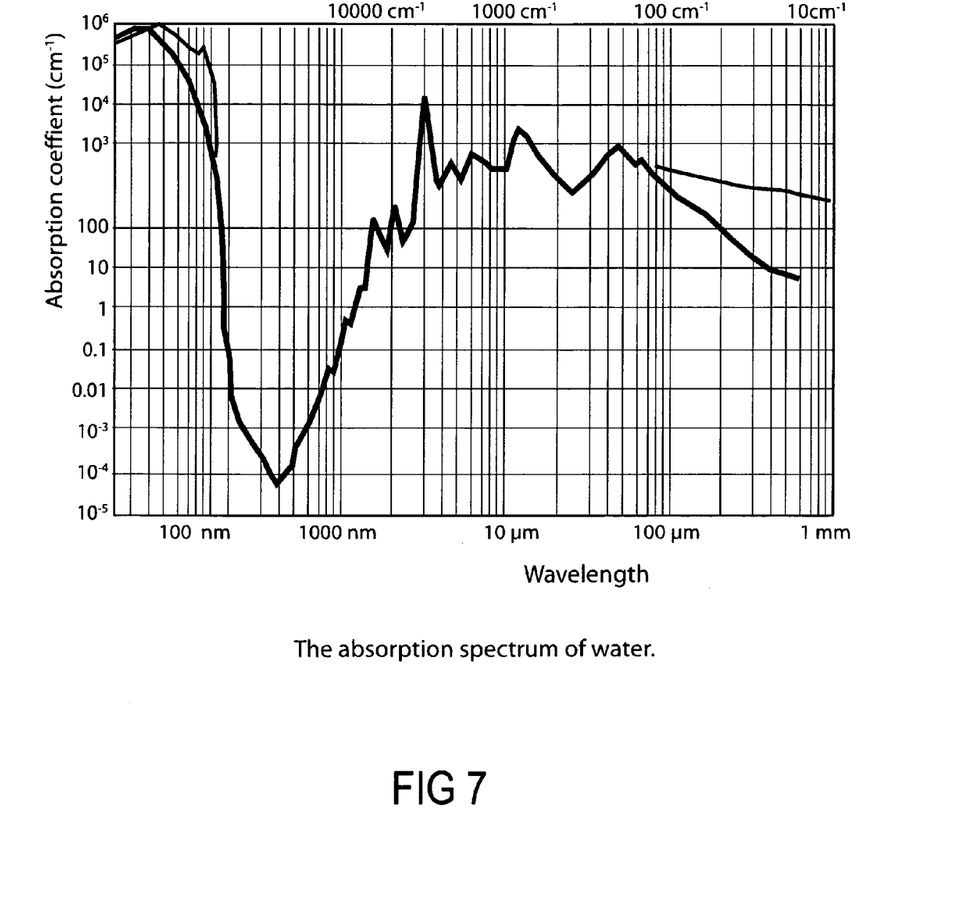
FIG. 7 is a graph of the absorbance spectrum of water.

Xenon flash lamps contain a lot of "spikes" in the near IR spectra that can lead to erroneous solar simulator electrical characterization of the PV device. FIG. 7 shows the absorbance spectrum of water. Water will pass the wavelengths of interest to our PV device but attenuate the far UV and parts of the near IR spectral ranges that maybe desirable to eliminate. Thus water or a water mixture 29 can be contained in the chamber 22 located between in the inner and outer cylinders to shape or filter the outgoing spectrum form the Xenon flash lamps. A filter film 30 can also be positioned in the outer casing 3 between the light source 31 and the transparent section 11 to filter or absorb the light produced by the light source. The filter film can be used separately or with the water that can be placed in the chamber 22.

In operation the PV solar device 35 is positioned on the exterior surface of the transparent section 11. As the PV solar device is flexible it can conform to the cylindrical shape of the transparent section 11. The transparent section positions the PV solar device 35 a constant distance from the light source 31. The light source 31 is then activated to generate light energy that is collected by the PV solar device. The performance parameters of the PV solar device 35 can then be measured. Normally the current voltage characteristics of the PV device 35 are measured. As the PV solar device is positioned a constant distance from the light source 31, the simulator 1 provides a uniformity of illumination to the PV solar device. If desired, water can be admitted to the chamber 22 through the valve 27 on the end cap 15. The water 29 in the chamber surrounds the inner cylinder 21 where the light source 31 is located. The water modifies the light that is received by the PV solar device 35. Essentially, the water 29 acts as a light spectrum filter that absorbs undesirable light energy from a portion of the light spectrum produced by the light source 31. In some applications a dye or other light modifying fluids can be added to the water to further modify the light that is received by the PV solar device 35. A light measurement station 79 can be included to measure the light energy that is made available to the PV solar device 35.

Figure 10:
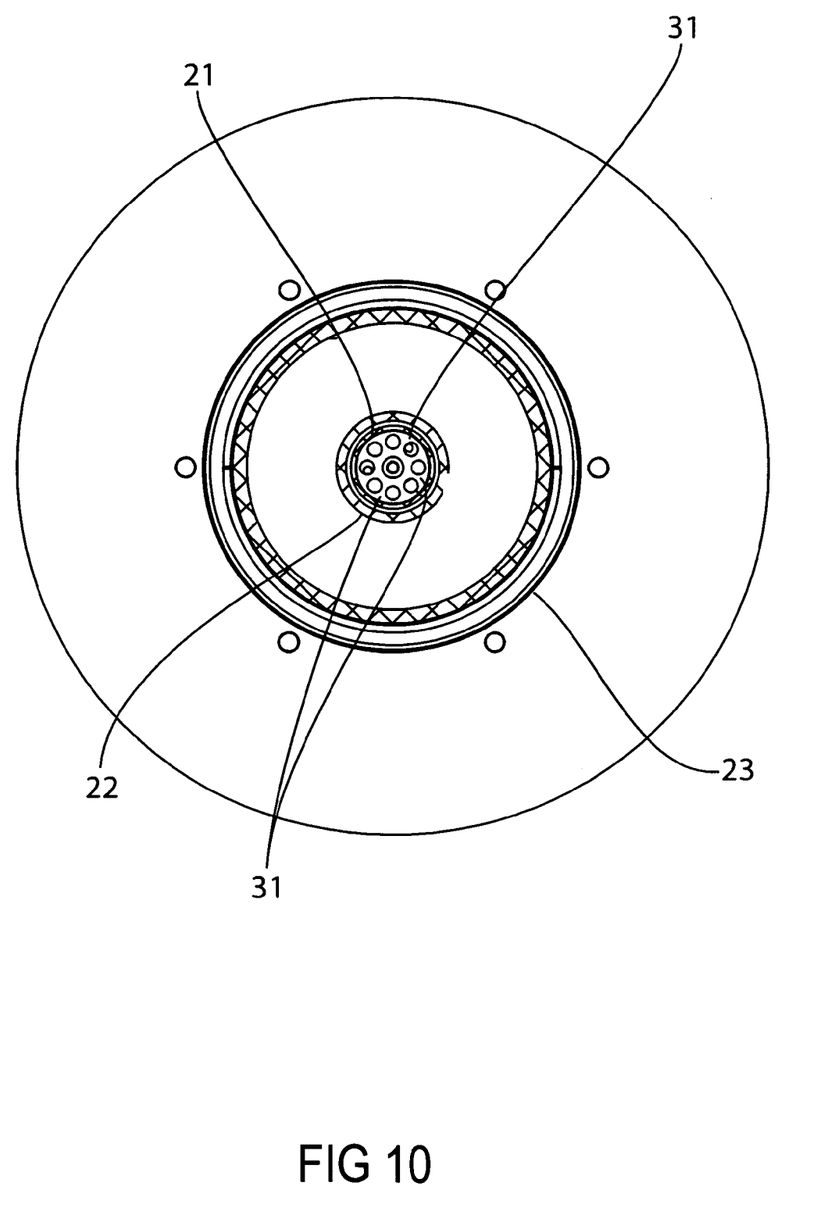
FIG. 10 is a cross-section depiction of the Invention showing details of the inner cylinder.

As shown in FIG. 10, more than one light source 31 can be positioned in the inner cylinder 21 if desired. In this figure a symmetrical arrangement has been configured for the light sources to provide a uniformity of light energy to the PV device 35 positioned on the exterior surface of transparent section 11. The support disks 33 used to support the light sources are modified to provide for the symmetrical positioning for the light sources.

FIGS. 11-16 shows another feature of the simulator where the opaque sections 7 are in the form of truncated cones to reduce the size and material needed to form the simulator 1. The simulator is also mounted on a carriage 55 to allow the simulator to be easily positioned in a desired location.

FIG. 17 shows additional features of the simulator invention. A generally rectangular support frame 41 is positioned in spaced apart relationship from a base frame 45. The base frame and support frame are held in spaced apart relationship by legs 49 that extend between the support and base frames. A light source 51 is disposed on the base frame 45 so that light from the light source will be directed towards the support frame 41. A reflector panel 53 can be position on the base frame 45 to assist in directing light from the light source 51 towards the support frame 41. A curved translucent or transparent panel 61 is positioned on the support frame to receive light from the light source. The translucent panel can be made of translucent or transparent materials as previously described. A photovoltaic solar device 66 is positioned on the curved translucent panel for receiving the light from the light source. The curved translucent panel 61 has a radius of curvature that maintains the solar device 66 spaced apart from the light source 51 a constant distance. The operation of this version of the simulator would be the same as previously described.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A solar simulator for testing flexible photovoltaic devices comprising:
   a curved surface topography having a translucent portion upon which the flexible photovoltaic devices can be positioned; and
   a light source positioned in spaced apart relationship with the curved surface, the light source being disposed to provide a uniform light intensity to the flexible photovoltaic device.

2. The simulator of claim 1 wherein the curved surface is a cylinder.

3. The simulator of claim 2 wherein the translucent portion is a transparent material selected from materials comprising plastic and glass.

4. The simulator of claim 2 wherein at least one non-translucent section is positioned adjacent the translucent portion of the cylinder.

5. The simulator of claim 2 wherein the light source is positioned in an inner cylinder, the inner cylinder having at least a translucent section wherein the translucent section on the inner cylinder is positioned to be in alignment with the flexible photovoltaic device positioned on the translucent portion of the cylinder.

6. The simulator of claim 5 wherein an outer cylinder is positioned around the translucent inner cylinder, the outer cylinder having at least a translucent section that is in alignment with the translucent section in the inner cylinder, the outer cylinder being disposed within the cylinder on which the flexible photovoltaic device is positioned.

7. The simulator of claim 6 wherein the inner and outer cylinders are positioned with the longitudinal axis of the inner and outer cylinders in alignment with the longitudinal axis of the cylinder upon which the flexible photovoltaic device is positioned.

8. The simulator of claim 7 wherein the translucent section of the inner and outer cylinder is made of a material selected from materials comprising plastic and glass.

9. The simulator of claim 7 wherein a fluid can be introduced in a chamber between the inner cylinder and the outer cylinder.

10. The simulator of claim 9 wherein the fluid is at least partially water.

11. The simulator of claim 10 wherein at least one dye can be present in the fluid in the chamber between the inner and outer cylinders.

12. The simulator of claim 1 wherein the light source is a Xenon flash lamp.

13. The device of claim 1 wherein a reflector can be positioned adjacent the light source to assist in providing a constant and uniform light intensity to the flexible photovoltaic device.

14. The simulator of claim 1 wherein a light intensity filtering film can be positioned adjacent the light source to modify the light intensity characteristics for the light emitted from the light source to assist in providing a constant and uniform light intensity to the flexible photovoltaic device.

15. The simulator of claim 1 wherein a light spectrum filtering film can be positioned adjacent the light source to modify the light spectrum distribution for the light emitted from the light source to assist in simulating standard solar light spectra required for photovoltaic solar device measurement.

16. The simulator of claim 4 wherein the at least one non-translucent section can be coated to reflect light produced by the light source.

17. The simulator of claim 4 wherein the at least one non-translucent section can be coated to absorb light produced by the light source.

18. The simulator of claim 2 wherein a texture is applied to the translucent portion of the cylinder, the texture acting to defuse the light produced by the light source.

19. The simulator of claim 2 wherein a drive mechanism is connected to the cylinder, the drive mechanism being capable of rotating at least the translucent portion of the cylinder.

* * * * *